Figure 2:
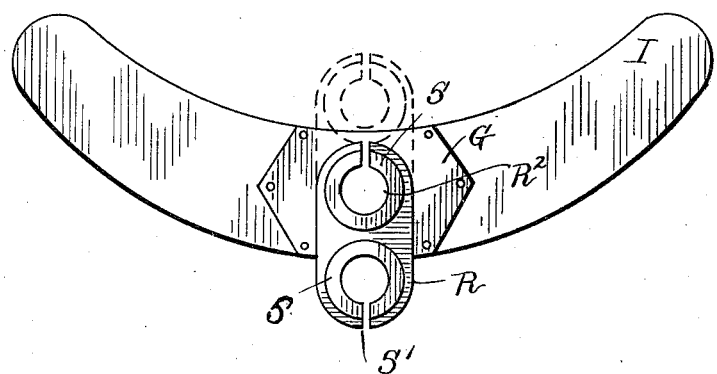

D. HEPP.
COMBINED TIE AND COLLAR FASTENER.
APPLICATION FILED DEC. 10, 1908.

1,019,324.

Patented Mar. 5, 1912.

Witnesses

Inventor
Daniel Hepp.
By Alex. J. Wedderburn Jr.
Attorney

UNITED STATES PATENT OFFICE.

DANIEL HEPP, OF CHICAGO, ILLINOIS.

COMBINED TIE AND COLLAR FASTENER.

1,019,324.  Specification of Letters Patent.  Patented Mar. 5, 1912.

Application filed December 10, 1908. Serial No. 466,858.

*To all whom it may concern:*

Be it known that I, DANIEL HEPP, a citizen of the United States, residing at Chicago, in the county of Cook and State of Illinois, have invented certain new and useful Improvements in Combined Tie and Collar Fasteners, of which the following is a specification.

This invention relates to a necktie fastener and more specifically to a novel attachment upon which is mounted a plate provided with one or more resilient seats for a collar button.

Hitherto the conventional type of necktie fastener for ready made neckties and similar cravats intended for ready connection to a turn-down or similar collar have retained many undesirable features which have retarded the simplicity and utility of the fastener.

The object of my invention is to provide a necktie fastener for a bow necktie and similar ready made cravats which will be positively held in engagement with a specially arranged collar button or stud.

With this and other advantages in view, my invention consists in the construction, combination, and arrangement of parts clearly shown in the drawings and defined in the appended claim.

Figure 1:
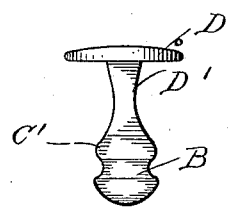

In the drawing, Figure 1 is a detailed view of a collar button intended for use with my novel necktie fastener. Fig. 2 is a front elevation of my necktie fastener showing the perforated plate suitably mounted thereon.

The collar button to be used in connection with my necktie fastener is of the usual construction with the exception that the stud portion thereof is somewhat elongated and formed with a groove.

D indicates the back plate or rest of the collar button, and $D^1$ is the shank thereof, and $C^1$ denotes the stud formed around its surface with the groove B. The necktie fastener comprises the bearing winged portion I which will, in the conventional manner, be inserted between the folds of a turn-down collar before the collar button is connected to a suitable opening now to be described. The portion I will be formed of rigid material of suitable contour and upon it, preferably in a central position, will be suitably mounted a plate G taking the marginal outline of the winged portion I. The plate G carries the elongated perforated member R which may have one or more openings $R^2$ for the reception of a collar button. As shown, the member R is formed with two split openings $R^2$ having flanged collars S, the opposite separated walls of the opening being shown at $S^1$. The two openings $R^2$ are preferably in alinement and the split portions $S^1$ are positioned at the ends of the member R being pivoted to the plate G upon which it is mounted, and preferably with one of the openings projecting at the bottom of the bearing surface I. It will be understood, however, that one of the openings $R^2$ may project at the upper end of the bearing surface I without detracting in any way from the utility of the device, as shown in dotted lines. The winged bearing surface I has a corresponding opening registering with the opening formed in the body of the plate G and member R.

In operation, the collar button of the form and arrangement shown in Fig. 1 will be passed through the button hole therefor in a garment and the bearing surface I having been interposed between the folded portion of a turn-down collar the same will be so positioned that the stud $C^1$ of the collar button may be freely inserted through either one of the openings $R^2$ in the member R, according to the convenience which it is desired to subserve. The stud portion $C^1$ is of a greater diameter than said opening $R^2$ but the groove way B in the stud is arranged to snugly engage the wall of either opening, and it will be obvious that it is the function of the split or cut away portion of each opening to yield to the advance of the stud $C^1$; having been placed over the opening, the button is pushed through thereby forcing asunder the opposite portions which are cut away; thereby causing the flanged collars S of the opening to embrace the wall of the groove B to hold the collar button and bearing surface I in connection with the garment. The bow or other form of ready made necktie or cravat will be secured to my necktie fastener in the method now known to those skilled in the art.

That which I desire to claim by Letters Patent, is—

A combined tie and collar fastener, consisting of a button having a grooved head, a tie backing, an oblong plate pivoted to said tie backing, said plate being provided with perforations at either end thereof and having slots extending therefrom for engaging the grooved head of the button, one of said perforations being at the pivotal point of said plate.

In testimony whereof I affix my signature, in presence of two witnesses.

DANIEL HEPP.

Witnesses:
HERBERT DIERSSEN,
LESLIE M. O'CONNOR.

Copies of this patent may be obtained for five cents each, by addressing the "Commissioner of Patents, Washington, D. C."